No. 818,101. PATENTED APR. 17, 1906.
H. H. LAMONT.
FLAX THRESHING MACHINE.
APPLICATION FILED AUG. 19, 1902. RENEWED MAR. 20, 1906.
2 SHEETS—SHEET 1.
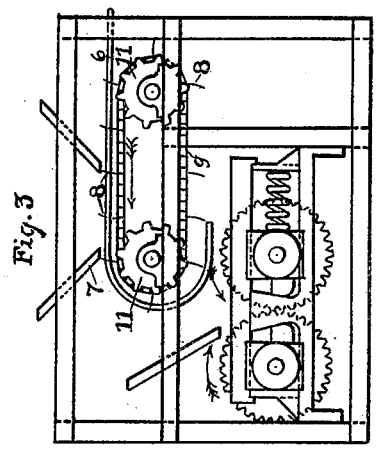
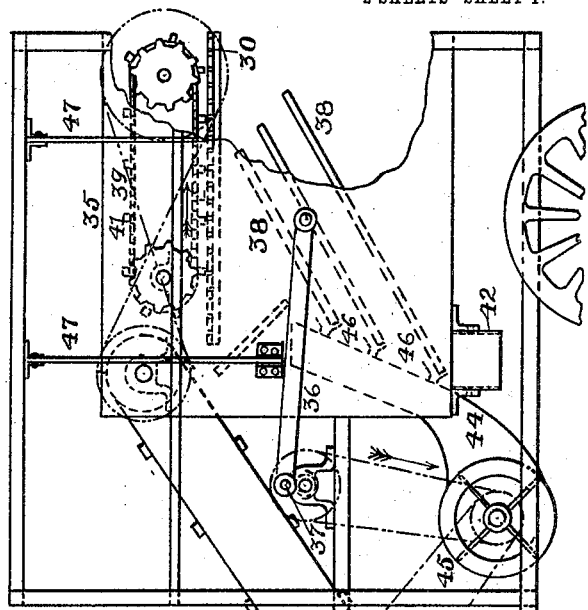
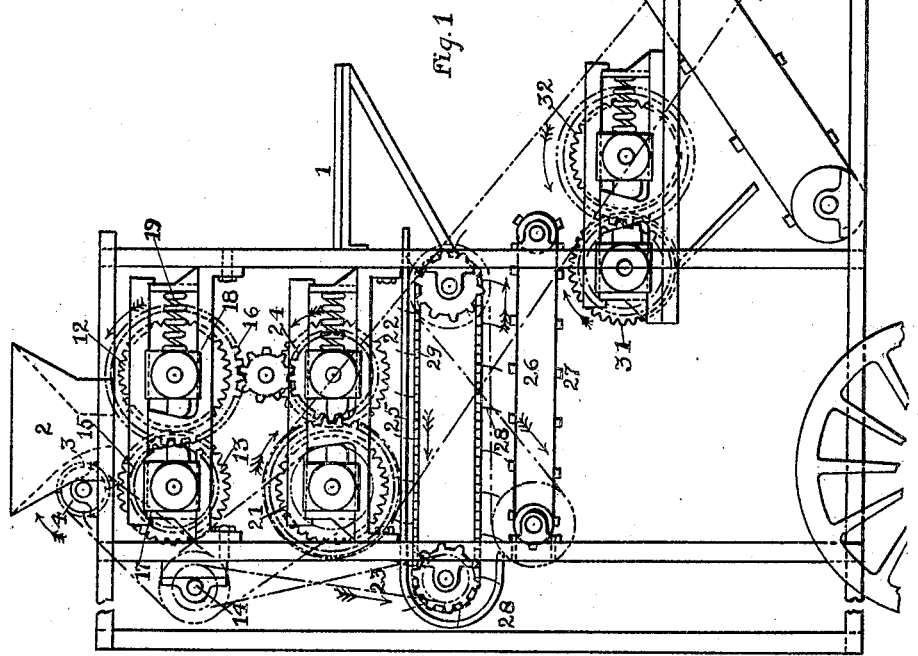
Witnesses:
M. R. Seely
H. D. Churchill
Inventor:
Hugh H. Lamont
by Spear & Seely
Attorneys.

No. 818,101. PATENTED APR. 17, 1906.
H. H. LAMONT.
FLAX THRESHING MACHINE.
APPLICATION FILED AUG. 19, 1902. RENEWED MAR. 20, 1906.
2 SHEETS—SHEET 2.
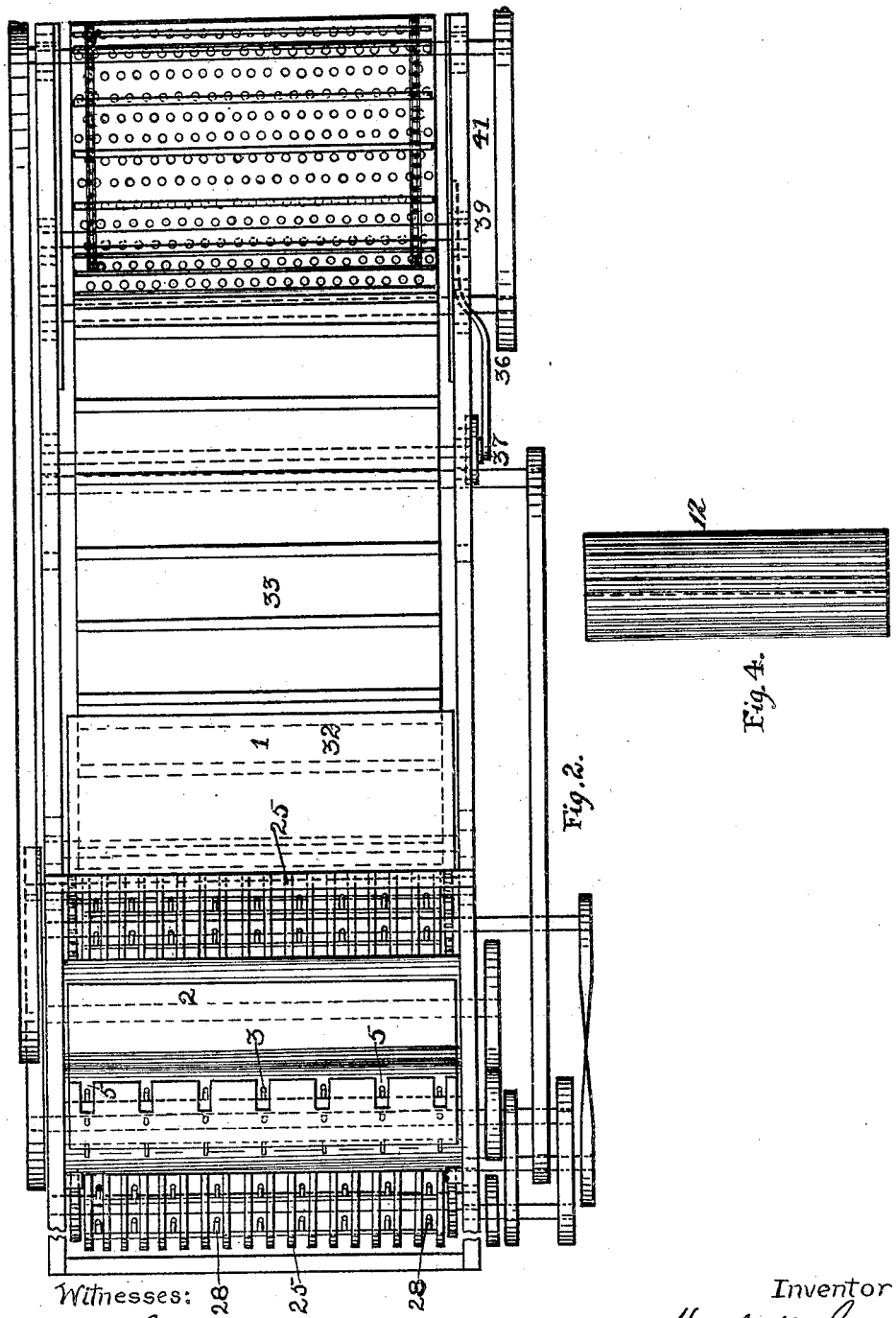
Witnesses:
M. R. Seely
M. B. Churchill
Inventor:
Hugh H. Lamont
by Spear & Seely
Attorneys

UNITED STATES PATENT OFFICE.

HUGH H. LAMONT, OF SAN FRANCISCO, CALIFORNIA.

FLAX-THRESHING MACHINE.

No. 818,101.  Specification of Letters Patent.  Patented April 17, 1906.

Application filed August 19, 1902. Renewed March 20, 1906. Serial No. 307,065.

*To all whom it may concern:*

Be it known that I, HUGH H. LAMONT, a citizen of the United States, residing at San Francisco, in the county of San Francisco and State of California, have invented certain new and useful Improvements in Flax-Threshing Machines, of which the following is a specification.

My invention relates to the threshing of flax, which includes the separation of the seed-bolls from the straw and the separation of the seeds from the bolls and chaff.

The object of the invention is, first, to provide for an effective separation of the seed-bolls by a treatment which insures the discharge of the straw from the machine uncrushed with the fiber in good condition and with the stalks in orderly arrangement ready for binding.

A further object is the accomplishment of the complete separation of the seed from the crushed bolls and other chaff, resulting in the delivery of a clean product.

The machine is designed only for flax-threshing, for which grain-threshing machines are in no way adapted where the straw and fiber are to be preserved. The straw in grain-threshing being a worthless remainder, it is immaterial whether it is destroyed or not; but the straw of flax, containing the valuable fiber or an important commercial product, the saving of which is as vital as the preservation of the seed itself. Grain-threshers injure the straw by cutting and tangling to an extent, which prevents its use as a spinning-fiber, and, moreover, such threshers being especially adapted to work on grain do not make a clean separation with flax, but always lose a considerable percentage of seed.

An embodiment of my invention for accomplishing the objects above referred to, is illustrated in the accompanying drawings; and I wish to state that such drawings have been principally confined to an illustration of the practical operative separating mechanisms without special attention to the framing of the machine or driving connections, where these will be readily understood and can be supplied by those skilled in the art or by ordinarily skilled mechanics.

Figure 1 is a general side view of the entire apparatus. Fig. 2 is a plan view. Fig. 3 is a modification of the hopper-feed. Fig. 4 is a plan of one of the crushing-rolls.

Assuming that the operative parts shown in the drawings are mounted upon a suitable frame or supporting structure, preferably wheeled, so as to be portable, a part of such frame is a platform 1, upon which the attendant who feeds the machine takes his stand. Conveniently accessible to him is a feed-hopper 2, having a long narrow discharge-opening. In connection with this hopper operates a movable feeder suitably driven and provided with rake teeth or prongs 3, which enter the hopper. In Fig. 1 these teeth project from a roll 4 in front of the hopper, the latter being slotted, as at 5, Fig. 2, to admit said teeth. In this case the discharge-opening of the hopper is at the bottom. In the modification shown in Fig. 3 the bottom of the hopper is slotted or formed with slats or a grating 6, the discharge-outlet 7 is at the front above the grating, and the teeth 8 are carried by a belt or endless chain 9, mounted on sprockets 11, beneath the grating, so that the teeth project into the hopper from below. Whichever construction of feed is used, the flax placed in the hopper by the attendant is separated by the traveling prongs and delivered with substantial uniformity between the crushing-rolls 12 13. These rolls are preferably longitudinally fluted and may be of the same diameter, but are driven at differential speed by gears deriving motion from the shaft 14, which latter can also drive the feeding-rake. In Fig. 1, gear 15 of roll 13 gears up gear 16 of roll 12. The rolls are journaled in suitable boxes 17 18, boxes 18 being sliding boxes under pressure of spring 19, which may be provided with any suitable regulating device to vary the pressure by which it holds roller 13 up to its work while permitting it to yield. These rolls crush the seed-bolls and are also positive separating devices, their differential speed producing a dragging action in addition to a direct crushing-pressure. One pair of these crushing-rolls may be found sufficient; but in practice I prefer to employ two or more pairs of similar rolls and have shown a second pair of such rolls 21 22 beneath the first pair, whose gears 23 24 may form one system with the gears of said first pair, the arrangement providing for differential speed between the members of the second pair, as illustrated in Fig. 1. One roller of the second pair should also be adjustable, like roller 13, and it is so shown in the drawings.

Beneath the crushing-rolls is a slotted table or grating 25, upon which all the material passing through the said rolls falls. The seed and chaff, including seed not wholly separated from the bolls, fall through the grating and upon the endless-belt conveyer 26, which has cross-bars 27 to assist the carrying action. The straw remains on the grating 25 in orderly arrangement uncrushed and unbruised and entirely separated from the seed-bolls, for while seed may adhere to the chaff after leaving the crushing-rolls the separation of the bolls (and hence of the seed) from the straw is complete at that point. The straw ready for binding is carried off the grating 25 by traveling rake-teeth 28, which project through the grating. These teeth, preferably slightly curved, are secured to separated cross-bars which transversely connect sprocket-chains 29 immediately beneath the grating, so that all material which passes through the fixed grating passes also between the cross-bars of the chains.

The conveyer 26 removes the chaff and seed toward the rear of the machine and delivers all between two rolls 31 32, substantially like those before described, which complete the final separation of the seed from the bolls and pass seed and chaff to an endless conveyer 33, by which they are carried to the cleaning devices, where the chaff is entirely removed and the cleaned seed discharged.

The cleaning devices are carried by a shaking-casing 35, connected by a pitman 36 to a crank-shaft 37, from which, therefore, it derives a longitudinal vibration or reciprocation. Mounted near the upper part of the casing is a screen 30 of proper mesh to pass the seed, which, with the chaff, falls upon it from the conveyer 33. Through this screen the seed and fine chaff escape to the inclined separating-tables 38 beneath; but, in order to distribute the mass and prevent it from piling or banking up at one end of the screen as it comes from conveyer 33 and also to carry off heavy chaff and seed branches, I provide a distributer consisting of endless chains 39, having slats 41, which run nearly in contact with the surface of the screen, and so distribute such material in a thin layer over that surface and facilitate its passage through the meshes.

The tables 38 may be of any suitable number arranged at a suitable incline downwardly toward the seed-discharge 42. I prefer to use solid tables instead of screens, as when a series of the latter are used the meshes become clogged and fouled.

The separating device is an air-trunk 44, supplied by a blower 45 and having separate discharge branches 46, opening above the tables. By regulating the air-pressure according to the gravity of the seed in the inclined tables the chaff will all be blown out between the tables and through the open rear end of the casing, while the seed overcoming the blast will be discharged from the separate tables and into the common seed-exit 42.

To provide for regularity in the shaking motion, I prefer to suspend the casing by spring-hangers 47 from some fixed part of the main framing of the machine.

Having thus fully described my invention, what I claim as new, and desire to secure by Letters Patent, is—

1. In a flax-threshing machine, an open-bottomed feeding-hopper adapted to receive a mass of flax and without spreading the same, an endless feeder having teeth adapted to project into said hopper and to discharge material from the bottom of the mass, and crushing-rolls below the hopper between which the said discharged material is delivered.

2. In a flax-threshing machine, an open-bottomed hopped adapted to receive flax in a mass, an endless feeder having teeth adapted to project into said hopper and to discharge material from the bottom of the mass, and a plurality of pairs of crushing-rolls having their members differentially geared, one of said pairs of rolls receiving the material between them from above and delivering it downwardly to another pair, the downward delivery being aided by the gravity of the material.

3. In a flax-threshing machine, an open-bottomed feeding-hopper adapted to receive the raw material in mass and without spreading the same, an endless feeder having teeth adapted to project directly into said hopper and to discharge material from the bottom of the mass, and crushing-rolls arranged in the same horizontal plane beneath the hopper, between which said discharged material is delivered.

4. In a flax-threshing machine, a device for separating the seed from the chaff, comprising a shaking-casing, a screen secured to and moving therewith, a traveling scraper running in proximity to said screen, a series of inclined solid tables of different lengths, all extending in the same direction, and means for forcing air between the tables in opposition to the downhill travel of the seed.

5. In a flax-threshing machine, the combination with an open-bottomed hopper, of an endless carrier having teeth projecting into said hopper, and crushing-rolls directly beneath the hopper.

In testimony whereof I have affixed my signature, in presence of two witnesses, this 6th day of August, 1902.

HUGH H. LAMONT.

Witnesses:
S. W. SEELY,
F. M. BURT.